United States Patent [19]

Borsuk

[11] 4,208,093
[45] Jun. 17, 1980

[54] FIBER OPTIC FERRULE AND METHOD OF TERMINATING SAME TO A CABLE

[75] Inventor: Leslie M. Borsuk, Los Alimitos, Calif.

[73] Assignee: International Telephone and Telegraph Corporation, New York, N.Y.

[21] Appl. No.: 957,643

[22] Filed: Nov. 3, 1978

[51] Int. Cl.² .............................................. G02B 5/14
[52] U.S. Cl. ............................... 350/96.20; 350/96.21
[58] Field of Search ................. 350/96.20, 96.21, 96.22

[56] References Cited

U.S. PATENT DOCUMENTS

| | | | |
|---|---|---|---|
| 3,902,785 | 9/1975 | Mathews | 350/96.21 |
| 4,023,886 | 5/1977 | Nakayama et al. | 350/96.21 |
| 4,087,155 | 5/1978 | Deacon | 350/96.21 |
| 4,090,778 | 5/1978 | Phillips et al. | 350/96.21 |
| 4,158,476 | 6/1979 | McCartney | 350/96.21 |

*Primary Examiner*—Stewart J. Levy
*Attorney, Agent, or Firm*—Thomas L. Peterson

[57] ABSTRACT

A fiber optic ferrule is disclosed which utilizes three spheres that define a tricuspid interstitial space therebetween into which the end of an optical fiber is mounted. A collar is threadedly mounted on the forward end of the ferrule body. The collar embodies an inwardly extending lip which urges the spheres radially inwardly when the collar is threaded onto the body. A sleeve is threadedly mounted on the rear of the body. To terminate the ferrule to a fiber optic cable, the fiber of the cable is first inserted through the ferrule body into the interstitial space forwardly beyond the spheres. The sleeve is crimped onto the jacket of the cable. By the use of appropriate indicia on the sleeve and the ferrule body, the sleeve is located at a predetermined position axially on the body. Tension is applied to the fiber. Then the collar is threaded onto the body to contract the spheres inwardly and cleave the fiber at the tangency point of the spheres. The sleeve is then rotated to a second position, indicated by second indicia on the ferrule body, thus advancing the fiber to the appropriate position in the interstitial space for abutting the fiber in a mating ferrule.

11 Claims, 3 Drawing Figures

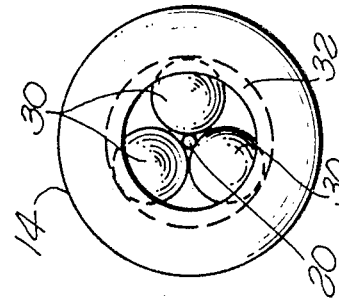
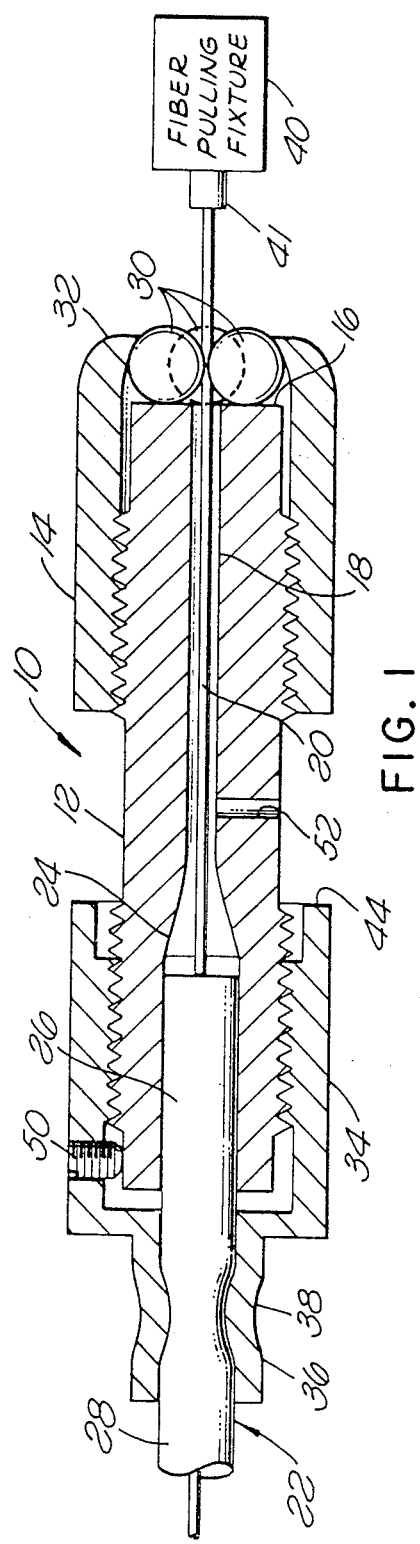
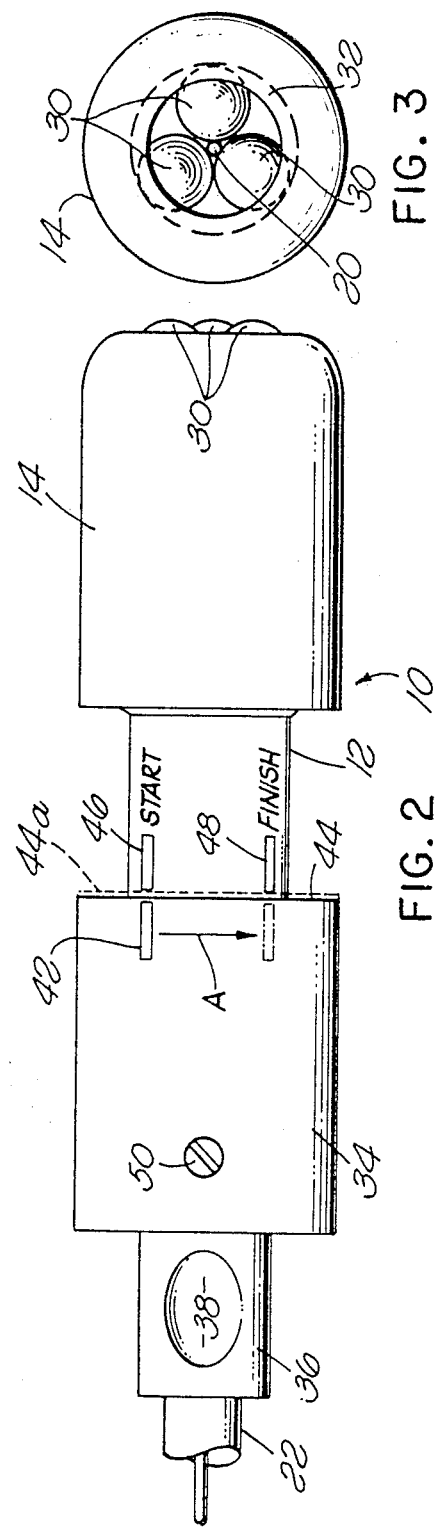

FIBER OPTIC FERRULE AND METHOD OF TERMINATING SAME TO A CABLE

The United States Government has rights in this invention pursuant to Contract No. DAAB07-76-C-1357 awarded by the Department of the Army.

BACKGROUND OF THE INVENTION

The present invention relates to a single optical fiber ferrule and to a method for terminating the ferrule to a fiber optic cable.

U.S. Pat. No. 4,087,155 to Deacon, assigned to the assignee of the present application, discloses a connector for coupling a pair of single optical fibers which provides precise lateral alignment between the fibers. Each contact or ferrule of the connector utilizes three spheres of equal diameter defining a tricuspid interstitial space therebetween into which the end of a fiber is mounted. The spheres are arranged in closely adjacent, but not necessarily engaging relationship in each ferrule. The centers of the spheres of each ferrule lie in a common plane normal to the axial length of the optical fiber. The spheres are dimensioned, to a close tolerance, to closely confine the fiber in the interstitial space. The spheres of one of the ferrules abuts under an axial compression force against those of the other ferrule so that the spheres nest with respect to each other, whereby the optical fiber in the space of said one ferrule is brought into close lateral alignment with that of the mating ferrule.

In one embodiment disclosed in the Deacon patent, the spheres are dimensioned relative to the optical fiber so that the spheres all engage each other, but do not engage the fiber, whereby the fiber has a slightly loose fit in the interstitial space between the spheres. This arrangement is convenient since the fiber can be inserted into the interstitial space without an interference fit. However, because the fiber is loose in the space, light transmission losses may occur between mating ferrules. The Deacon patent discloses a second embodiment in which the spheres are dimensioned relative to the fiber so that they all engage the fiber, but do not engage each other. In this case, there is an interference fit between the fiber and the spheres, making insertion of the fiber between the spheres more difficult, but more precise lateral alignment of the fibers in two mating ferrules may be achieved.

Copending application of R. L. McCartney, Ser. No. 861,110 filed Dec. 16, 1977, now U.S. Pat. No. 4,158,476 entitled: "Single Optical Fiber Connector", assigned to the assignee of the present application, discloses an optical fiber ferrule utilizing alignment spheres with adjustment means which allows the spheres to spread apart to facilitate insertion of an oversized fiber therebetween. Such adjustment means comprises a collar which is mounted on the forward end of the ferrule body. A radially inwardly directed lip on the forward end of the collar retains the spheres against the front face of the body. The lip exerts a radially inwardly and rearwardly directed force against the spheres to retain and consolidate the spheres at the front of the ferrule. By moving the collar forwardly on the ferrule body, the force on the spheres is released, thereby allowing an optical fiber to be inserted into the interstitial space between the spheres even though the fiber is slightly oversized. The collar is then moved rearwardly so that the inwardly directed lip thereon urges the spheres inwardly around the fiber. Thus, the interstitial space may be adjusted to accommodate an oversized fiber, whereby the fiber is firmly mounted in the space thus minimizing light transmission losses between mating ferrules.

To maximize light transmission through a pair of mating ferrules, the fiber end faces in the ferrules must be precisely located so that they will abut when the ferrules are mated. As explained in the Deacon patent, the precise location of the end face of the fiber may be achieved by using a fourth larger sphere nested among the three spheres at the front thereof. The fiber end face, when positioned against this sphere, will be at the precise recessed location required to provide a zero gap when aligned with the fiber in a mating ferrule. The location of the fiber end face required when two ferrules are mated and the diameter of the fourth fiber positioning sphere are disclosed in the Deacon patent.

To terminate a ferrule of the aforementioned type to an optical fiber, the first step is to prepare the end face of the fiber. The end face must be perpendicular to the fiber axis optically clear. A known method for achieving such an end face is by cleaving. To cleave the fiber, it is pulled in tension and scribed with a diamond or other suitable hard material. Once the fiber is cleaved, it is threaded through the ferrule. To allow the spheres to spread, the collar on the forward end of the ferrule is loosened as previously explained. The fiber is positioned approximately even with the front of the spheres. Then the spheres are clamped lightly to the fiber by the collar. By nesting the large sphere to the front of the three spheres in the ferrule, the fiber is pushed back to its proper location. An epoxy may then be used to permanently retain the fiber in proper position in the ferrule. While this procedure is entirely satisfactory, it is time consuming and requires a relatively high degree of skill.

It is the object of the present invention to provide a novel method of terminating an optical fiber ferrule, which embodies alignment spheres, to a fiber optic cable which may be performed more rapidly and with less skill than the prior procedures, and without the requirement of a fourth fiber positioning sphere, and to provide a novel fiber optic ferrule which facilitates the implementation of such method.

SUMMARY OF THE INVENTION

According to a principal aspect of the present invention, there is provided a method for terminating a ferrule to a light transmitting optical fiber wherein the ferrule contains a set of spheres arranged in closely adjacent relationship defining an interstitial space therebetween. The spheres are dimensioned to each engage the optical fiber to be inserted into the space. An optical fiber is inserted into the ferrule from the rear thereof until the fiber extends through the space forwardly beyond the spheres. Tension is applied to the optical fiber. The spheres are then contracted radially inwardly to cleave the optical fiber at the tangency point of the spheres, thereby forming in situ in the ferrule the flat end face of the fiber at predetermined position therein.

Because the optical fiber is cleaved in situ at a predetermined position in the ferrule the requirement for using an enlarged fourth sphere to locate the end face of the fiber at a predetermined position in the ferrule is eliminated.

According to another aspect of the present invention, there is provided a novel fiber optic ferrule for precisely locating the end face of the cleaved fiber in its proper matable position in the ferrule between the tangency point of the spheres with the fiber and the forwardmost surfaces of the spheres so that when two mating like ferrules are interengaged, there will be a zero gap between the end faces of the fibers. To this end, by the present invention, the ferrule comprises a support body having a mating forward end and a rear. A set of spheres at the forward end are arranged in closely adjacent, but not necessarily engaging relationship, defining an interstitial space therebetween. The support body has a bore therethrough for positioning an optical fiber so that the end portion thereof will lie in the interstitial space. The spheres are dimensioned to each engage the optical fiber in the space. Means is provided for contracting the spheres radially inwardly to cleave the optical fiber in the interstitial space at the tangency point of the spheres. A sleeve is mounted on the rear of the support body embodying means for securing the sleeve to the optical fiber. Means is also provided for precisely adjusting the axial position of the sleeve on the support body. Indicating means on the support body indicates two axial positions of the sleeve on the support body. In one of the axial positions, the sleeve is adapted to locate the cleaved end of the optical fiber in proper matable position as defined above. Thus, by the present invention, the ferrule itself embodies precise adjusting means for locating the cleaved end face of an optical fiber in a proper position after the fiber has been cleaved by contracting the spheres therearound.

BRIEF DESCRIPTION OF THE DRAWINGS

FIG. 1 is an enlarged partial longitudinal sectional view of the ferrule of the present invention terminated to a fiber optic cable, with the fiber therein being shown attached to a fiber pulling fixture for applying tension to the fiber extending from the forward end of the ferrule;

FIG. 2 is a top plan view of the ferrule illustrated in FIG. 1 after the spheres have been contracted to cleave the optical fiber extending from the ferrule to the fiber pulling fixture; and FIG. 3 is a front end view of the ferrule illustrated in FIG. 2 with the fiber mounted therein.

DESCRIPTION OF THE PREFERRED EMBODIMENT

Referring now to the drawings in detail, there is illustrated the fiber optic ferrule or contact of the present invention, generally designated 10. The ferrule comprises a cylindrical support body 12 having a collar 14 threadedly mounted on its forward mating end 16. A bore extends axially through the body 12, comprising a forward section 18 of a relatively small diameter for slidably receiving the optical fiber 20 of a fiber optic cable, generally designated 22, and intermediate tapered transition section 24, and an enlarged rear section 26 dimensioned to slidably receive the jacket 28 of the cable 22 that surrounds the fiber 20.

The ferrule utilizes a plurality, preferably three as shown, of alignment spheres 30 at the forward mating end 16 of the ferrule body 12. The collar 14 embodies at its forward end a radially inwardly directed annular lip 32 which consolidates the spheres in closely adjacent relationship to define a tricuspid interstitial space therebetween aligned with the bore 18 and adapted to receive the forward end of the optical fiber 20. As described in detail in the aforementioned Deacon patent, when two ferrules are mated, the spheres in the ferrules nest with respect to each other, thereby bringing the optical fibers therein into precise lateral alignment.

In the present invention, the spheres 30 and fiber 20 are purposely dimensioned so that when the two spheres of two ferrules nest with respect to each other, the spheres in each set engage their respective optical fiber, but are out of engagement with each other, as best seen in FIG. 3. In other words, the fiber has an interference fit in the interstitial space between the spheres. As noted before, this arrangement has the advantage that the fiber is not loose in the interstitial space and, therefore, more precise lateral alignment of the fibers in mating ferrules can be achieved.

A sleeve 34 is threadedly mounted on the rear of the ferrule body 12. The sleeve embodies a relatively small diameter rear extension 36 which slidably receives the optical fiber cable 22. The extension 36 is crimped, as indicated at 38, to secure the sleeve to the jacket of the cable and, hence, the ferrule to the cable.

According to the method of the present invention, the ferrule 10 is terminated to the fiber optic cable 22 by first sliding the sleeve 34 onto the cable. The jacket 28 at the forward end of the cable is then removed exposing the bare optical fiber end 20. The collar 14 is advanced forwardly on the ferrule body 12 a short distance to release the pressure on the spheres 30, thereby opening the interstitial space to allow the fiber 20 to be freely inserted thereinto. The cable is then inserted into the ferrule 12 from the rear until the fiber extends through the interstitial space between the spheres 30 and forwardly beyond the spheres, and the jackets 28 extends into the enlarged rear bore section 26 of the ferrule. The rear extension 38 of the sleeve 34 is then crimped onto the cable 22 to fix the ferrule axially relative to the cable.

The ferrule is then inserted into a fiber pulling on tension fixture, shown schematically at 40, which embodies a chuck 42 that grips the end of the fiber 20. As the fixture 40 applies a controlled tension to the fiber 20, the collar 14 is threaded rearwardly on the ferrule body 12, thereby contracting the spheres radially inwardly. The radial inward contraction of the spheres applies sufficient radial force on the fiber 20 so that the fiber, being under tension, will cleave or break off at the tangency point of the spheres with the fiber. Thus, the fiber is cleaved in situ in the ferrule 10. Thereafter, the collar is again advanced forwardly on the ferrule body to loosen the pressure on the spheres 30, thereby opening the interstitial space between the spheres for the fiber. Then the sleeve 34 may be rotated to advance the cleaved end of the fiber a predetermined distance between the tangency point of the spheres with the fiber and the forwardmost surfaces of the spheres so that when the ferrule mates with an identical ferrule, the cleaved end faces of the fibers will engage with a zero gap. Such position of the end of the fiber with respect to the spheres is disclosed in the aforementioned Deacon patent.

According to another feature of the invention, there is provided indicia on the sleeve 34 and ferrule body 12 which allows the precise positioning of the cleaved end of the fiber after the fiber has been cleaved by the spheres 30. Such indicia includes a single scribe mark 42 on the sleeve 34 adjacent to its forward end 44 and two circumferentially spaced scribe marks 46 and 48 on the ferrule body 12 in front of the sleeve 34. The distance between the scribe marks 46 and 48 is selected so that rotation of the threaded sleeve 34 such distance will advance the cleaved end of the fiber forwardly in the interstitial space between the spheres to locate the cleaved end at its proper position hereinbefore defined.

In practice, the sleeve 34 is initially positioned so that the scribe mark 42 thereon is aligned with the scribe mark 46 on the ferrule body 12. With the sleeve so positioned relative to the ferrule body, and with the fiber 20 being subjected to tension by the fixture 40, the collar 14 is threaded rearwardly on the body as hereinfore described contacting the spheres to cleave the fiber at the tangency point of the spheres therewith. The collar is then advanced forwardly to release the pressure on the spheres, and then the sleeve 34 is rotated clockwise in the direction indicated by the arrow A in FIG. 2 until the scribe mark 42 reaches the position shown in phantom at 42a wherein the scribe mark is aligned with the scribe mark 48 on the ferrule body. Such rotation of the sleeve 34 advances the sleeve to the position shown in phantom at 44a in FIG. 2, which advances the cable 22 and, hence, the fiber 20 the required predetermined distance in the ferrule to properly locate the cleaved end of the fiber between the spheres 30. Thereafter, the collar 14 may be threaded rearwardly on the ferrule body to lightly consolidate the spheres around the fiber. The sleeve 34 may then be fixed in position by actuating a set screw 50 which bears against the rear of the ferrule body. In addition, an epoxy may be introduced by means of a syringe through a radial opening 52 in the ferrule body into the bore 18 to firmly secure the fiber therein.

The entire termination procedure of the present invention may be accomplished in approximately one minute by a relatively unskilled worker because cleaving of the fiber in a known position is achieved by simply rotating the collar 14, and the precise positioning of the cleaved end face of the fiber is achieved by rotating the sleeve 34 a predetermined distance readily determined by indicia on the ferrule body.

Because the sleeve is directly fixed to the cable 22 by crimping, some twisting of the cable will occur when the sleeve is rotated on the ferrule body. This may be eliminated by utilizing a separate crimp ring which is attached to the cable 22, and is rotatable within the sleeve 34 but fixed against axial movement within the sleeve.

The method of the present invention is not limited to the use of the specific ferrule 10 disclosed herein. For example, in copending application of L. M. Borsuk et al. entitled: "Single Optical Fiber Connector", Ser. No. 944,693, filed Sept. 22, 1978, there is disclosed a three-sphere single fiber ferrule in which the spheres are retained on the forward end of the ferrule body by a spring sleeve. The sleeve embodies three resilient fingers which urge the spheres inwardly and rearwardly under a controlled force. The use of the spring fingers avoids the possibility of fracturing of the optical fiber mounted in the interstitial space between the spheres. Rearward movement of the spring sleeve would not achieve cleaving of the fiber as by the use of the rigid collar 14 in the present invention. However, the method of the present invention may still be performed with the aforementioned ferrule utilizing a spring sleeve for holding the spheres on the ferrule body, by utilizing a special tool (not shown) which exerts a radially inwardly directed force on the spring fingers of the sleeve, and hence upon the spheres, to force them inwardly to cleave the fiber. The procedure for terminating the ferrule to a fiber cable would be otherwise as disclosed herein.

Thus, the method of the present invention may be performed in two ways, by in situ cleaving of the fiber by the use of a rigid collar 14 on the ferrule body acting against the spheres as illustrated in FIG. 1, or by applying an external force upon the spheres by the use of a special tool. In either case, the cleaved end of the fiber is located at a predetermined position in the ferrule, thus allowing such end to be shifted precisely to its final proper position.

What is claimed is:

1. A method of terminating a ferrule to a light transmitting optical fiber comprising the steps of:
    providing a ferrule containing a set of spheres arranged in closely adjacent relationship defining an interstitial space therebetween, said spheres being dimensioned to each engage the optical fiber to be inserted into said space;
    inserting said optical fiber into said ferrule from the rear thereof until said fiber extends through said space forwardly beyond said spheres;
    applying tension to said optical fiber; and
    contracting said spheres radially inwardly to cleave said optical fiber at the tangency point of said spheres.

2. A method as set forth in claim 1 including the additional step of:
    after cleaving said optical fiber, advancing said fiber forwardly in said ferrule a predetermined distance to locate the cleaved end of said fiber between said tangency point and the forwardmost surfaces of said spheres.

3. A method as set forth in claim 1 wherein said optical fiber is in a cable having a jacket covering said fiber, including the steps of:
    removing the jacket from an end of said cable prior to inserting said fiber into said ferrule;
    inserting said cable into said ferrule until said jacket enters said ferrule; and
    fixing said jacket and, hence, said cable, axially relative to said ferrule prior to applying tension to said optical fiber.

4. A method as set forth in claim 3 including the additional steps of:
    after cleaving said optical fiber, advancing said cable forwardly in said ferrule a predetermined distance to locate the cleaved end of said fiber between said tangency point and the forwardmost surfaces of said spheres.

5. A method as set forth in claim 4 including the additional steps of:
    providing a threaded sleeve on the body of said ferrule;
    fixing said jacket to said ferrule by attaching said sleeve to said jacket; and
    rotating said sleeve a predetermined distance to advance said cable.

6. A method as set forth in claim 5 including the additional steps of:
    securing said sleeve against rotation on the ferrule body after advancing said cable.

7. A fiber optic ferrule for a transmitting optical fiber comprising:
    a support body having a mating forward end and a rear;
    a set of spheres at said forward end, said spheres being arranged in closely adjacent, but not necessarily engaging, relationship defining an interstitial space therebetween;

said support body having a bore therethrough for positioning an optical fiber so that the end portion thereof lies in said insterstitial space, said spheres being dimensioned to each engage said optical fiber in said space;

means for contracting said spheres radially inwardly to cleave an optical fiber in said interstitial space at the tangency point of said spheres;

a sleeve on the rear of said support body embodying means for securing said sleeve to said optical fiber;

means for precisely adjusting the axial position of said sleeve on said support body; and means on said support body for indicating two axial positions of said sleeve on said support body, in one of said axial positions said sleeve being adapted to locate the cleaved end of the optical fiber in its proper matable position in said interstitial space between said tangency point and the forwardmost surfaces of said spheres.

8. A fiber optic ferrule as set forth in claim 7 wherein: said sleeve is threadedly mounted on said support body.

9. A fiber optic ferrule as set forth in claim 8 wherein: said indicating means includes first and second circumferentially spaced indicia on said support body adjacent to the forward end of said sleeve.

10. A fiber optic ferrule as set forth in claim 9 including:

an indicia on said sleeve adjacent to the forward end thereof, said sleeve indicia being aligned with said first indicia on said support body when said contracting means is operated to cleave said optical fiber, and said sleeve indicia being aligned with said second indicia when said sleeve is in said one axial position.

11. A fiber optic ferrule as set forth in claim 7 including:

means for releasably fixing the position of said sleeve on said support body.

* * * * *